United States Patent
Hosahalli Lingaiah (10) Patent No.: US 12,459,751 B2
(45) Date of Patent: Nov. 4, 2025

(54) BAGGAGE COLLECTION SYSTEMS AND METHODS

(71) Applicant: GOODRICH CORPORATION, Charlotte, NC (US)

(72) Inventor: Yadhu Kumar Hosahalli Lingaiah, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 879 days.

(21) Appl. No.: 17/709,090

(22) Filed: Mar. 30, 2022

(65) Prior Publication Data
US 2023/0183020 A1 Jun. 15, 2023

(30) Foreign Application Priority Data
Dec. 14, 2021 (IN) .............................. 202141058201

(51) Int. Cl.
*B65G 43/10* (2006.01)
*G06K 7/10* (2006.01)
*G06Q 10/08* (2024.01)

(52) U.S. Cl.
CPC ............. *B65G 43/10* (2013.01); *G06Q 10/08* (2013.01); *G06K 7/10297* (2013.01)

(58) Field of Classification Search
CPC ..... B65G 43/10; G06Q 10/08; G06K 7/10297
See application file for complete search history.

(56) References Cited

U.S. PATENT DOCUMENTS

| 3,552,540 | A | * | 1/1971 | Piper .................... B65G 47/681 |
| | | | | 198/357 |
| 9,315,278 | B2 | | 4/2016 | Song et al. |
| 10,275,845 | B2 | | 4/2019 | Mahfouz et al. |
| 10,336,555 | B1 | * | 7/2019 | Kurdi .................... B65G 47/48 |
| 10,745,150 | B2 | | 8/2020 | Lykkegaard |
| 10,773,900 | B1 | * | 9/2020 | Pinel ..................... B65G 43/10 |
| 10,776,593 | B1 | * | 9/2020 | Verma ................ G06Q 10/0631 |
| 2002/0040928 | A1 | | 4/2002 | Jalili et al. |
| 2012/0056723 | A1 | | 3/2012 | Zhu |

(Continued)

FOREIGN PATENT DOCUMENTS

| DE | 19649746 A1 | * | 6/1998 | ............. B65G 17/00 |
| FR | 2757140 A1 | * | 6/1998 | ........... B65G 47/503 |
| NL | 1023904 C2 | * | 1/2005 | .............. B64F 1/368 |

(Continued)

Primary Examiner — Jacob S. Scott
Assistant Examiner — Erin Morris
(74) Attorney, Agent, or Firm — SNELL & WILMER L.L.P.

(57) ABSTRACT

An article of manufacture can include a tangible, non-transitory computer-readable storage medium having instructions stored thereon that, in response to execution by a processor, cause the processor to perform operations comprising: receiving, by the processor and through a first scanner, a plurality of unique identifiers for a plurality of bags; receiving, by the processor through a second scanner, a first unique identifier for a bag; determining, by the processor, a location of the bag in a collection area of a conveyor system associated with the first unique identifier; and commanding, by the processor and through a collection device, transferring of the bag to a second conveyor belt for depositing at a pickup location.

20 Claims, 3 Drawing Sheets

(56) References Cited

U.S. PATENT DOCUMENTS

2017/0362033 A1\* 12/2017 Mahfouz ................ G06Q 50/40
2022/0378162 A1\* 12/2022 Moton, Jr. .............. H04W 4/12

FOREIGN PATENT DOCUMENTS

| WO | WO-2010067132 A2 \* | 6/2010 | ............. G06Q 10/08 |
| WO | WO-2015128645 A1 \* | 9/2015 | ......... G06K 19/0723 |
| WO | WO-2022017981 A1 \* | 1/2022 | .............. B64F 1/368 |

\* cited by examiner

BAGGAGE COLLECTION SYSTEMS AND METHODS

CROSS-REFERENCE TO RELATED APPLICATIONS

This application is a non-provisional of, and claims priority to, and the benefit of India Provisional Application No. 202141058201 with DAS Code CD73, entitled "BAGGAGE COLLECTION SYSTEMS AND METHODS," filed on Dec. 14, 2021, which is hereby incorporated by reference in its entirety for all purposes.

FIELD

The present disclosure relates to baggage collection systems, and more specifically to, automated baggage collection systems for use in airports.

BACKGROUND

A bag is entered into the baggage handling system when an airline agent, or self-check system, assign the luggage a tag with a unique ten digit barcode. Airlines are also incorporating radio frequency identification (RFID) chips into the tags to track bags in real time and to reduce the number of mishandled bags.

For baggage collection systems, a bag is unloaded from an aircraft and placed in a return side of the baggage handling system. A belt conveyor then transports all luggage from a respective arrival gate to a respective baggage collection area to deliver the bag to a respective passenger. Current systems utilize a conveyor system to deliver a bag to an end user. The conveyor system may be inconvenient for end users as the conveyor is constantly moving and bags may be heavy or difficult to lift while moving. Additionally, typical systems may be prone to someone grabbing an incorrect bag that looks similar to the users bag.

SUMMARY

An article of manufacture is disclosed herein. The article of manufacture can include a tangible, non-transitory computer-readable storage medium having instructions stored thereon that, in response to execution by a processor, cause the processor to perform operations comprising: receiving, by the processor and through a first scanner, a plurality of unique identifiers for a plurality of bags; receiving, by the processor through a second scanner, a first unique identifier for a bag; determining, by the processor, a location of the bag in a collection area of a conveyor system associated with the first unique identifier; and commanding, by the processor and through a collection device, transferring of the bag to a second conveyor belt for depositing at a pickup location.

In various embodiments, the operations further comprise determining, by the processor, whether the first unique identifier is a match with any identifier in the plurality of unique identifiers. The operations can further comprise generating, by the processor and through a notification device, a first notification in response to the first unique identifier not matching any identifier in the plurality of unique identifiers. The operations can further comprise generating, by the processor and through the notification device, a second notification in response to the first unique identifier matching a second unique identifier in the plurality of unique identifiers. The operations can further comprise identifying a specified location for depositing the bag. The operations can further comprise commanding, by the processor and through various valves, the various valves to be oriented in a manner to deposit the bag at the specified location.

In various embodiments, the operations further comprise determining, by the processor, the bag has been at the pickup location for more than a time threshold. The operations can further comprise commanding, by the processor, the bag to be transported to a conveyor belt at a point prior to the first scanner to be resent through the conveyor system.

A method for operating a requestor-based baggage collection system is disclosed herein. The method can comprise: receiving, by a processor, a plurality of unique identifiers for a plurality of bags; receiving, by the processor, a first unique identifier for a bag; determining, by the processor, a location of the bag in a collection area of a conveyor system associated with the first unique identifier; and commanding, by the processor, transferring of the bag to a second conveyor belt for depositing at a pickup location.

In various embodiments, the method further comprises determining, by the processor, whether the first unique identifier is a match with any identifier in the plurality of unique identifiers. The method can further comprise generating, by the processor and through a notification device, a first notification in response to the first unique identifier not matching any identifier in the plurality of unique identifiers. The method can further comprise generating, by the processor and through the notification device, a second notification in response to the first unique identifier matching a second unique identifier in the plurality of unique identifiers. The method can further comprise identifying a specified location for depositing the bag. The method can further comprise commanding, by the processor and through various valves, the various valves to be oriented in a manner to deposit the bag at the specified location.

In various embodiments, determining, by the processor, the bag has been at the pickup location for more than a time threshold. The method can further comprise commanding, by the processor, the bag to be resent through the conveyor system.

A requestor based baggage collection system is disclosed herein. The requestor based baggage collection system can comprise: a first conveyor system comprising an input conveyor belt and a collection area; a first scanner configured to scan a first unique identifier of a bag traveling along the input conveyor belt; a second scanner configured to scan a second unique identifier associated with the bag; a second conveyor system comprising a second conveyor belt configured to transfer the bag to an end baggage location; and a collection device configured to transfer the bag from the collection area to the second conveyor belt.

In various embodiments, the requestor based baggage collection system further comprises a main controller in electronic communication with the first scanner, the second scanner, and the collection device. The main controller can be configured to: receive, from the second scanner, the second unique identifier associated with the bag; determine, from data received from the first scanner, a location of the bag; and command the collection device to transfer the bag from the collection area to the second conveyor belt. The main controller can be further configured to determine the second unique identifier is a match with the first unique identifier.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Disclosed herein is a requestor-based baggage collection system. The requestor-based baggage system is configured to determine, based on requestor input, such as a reading from a scanner, a bag to collect and a location to deliver the bag. The requestor-based baggage system is further configured to collect the bag, deliver the bag to the location, and notify the requesting device who utilized the scanner the location the bag is to be delivered. In this regard, the requestor-based baggage system may automatically deliver a bag to a specified location in response to a user scanning an identifier for the bag and notifying the user of the specified location. Thus, the requestor-based baggage system disclosed herein may be more convenient than typical systems and provide a safeguard to prevent users from grabbing an incorrect bag, in accordance with various embodiments.

Figure 1:
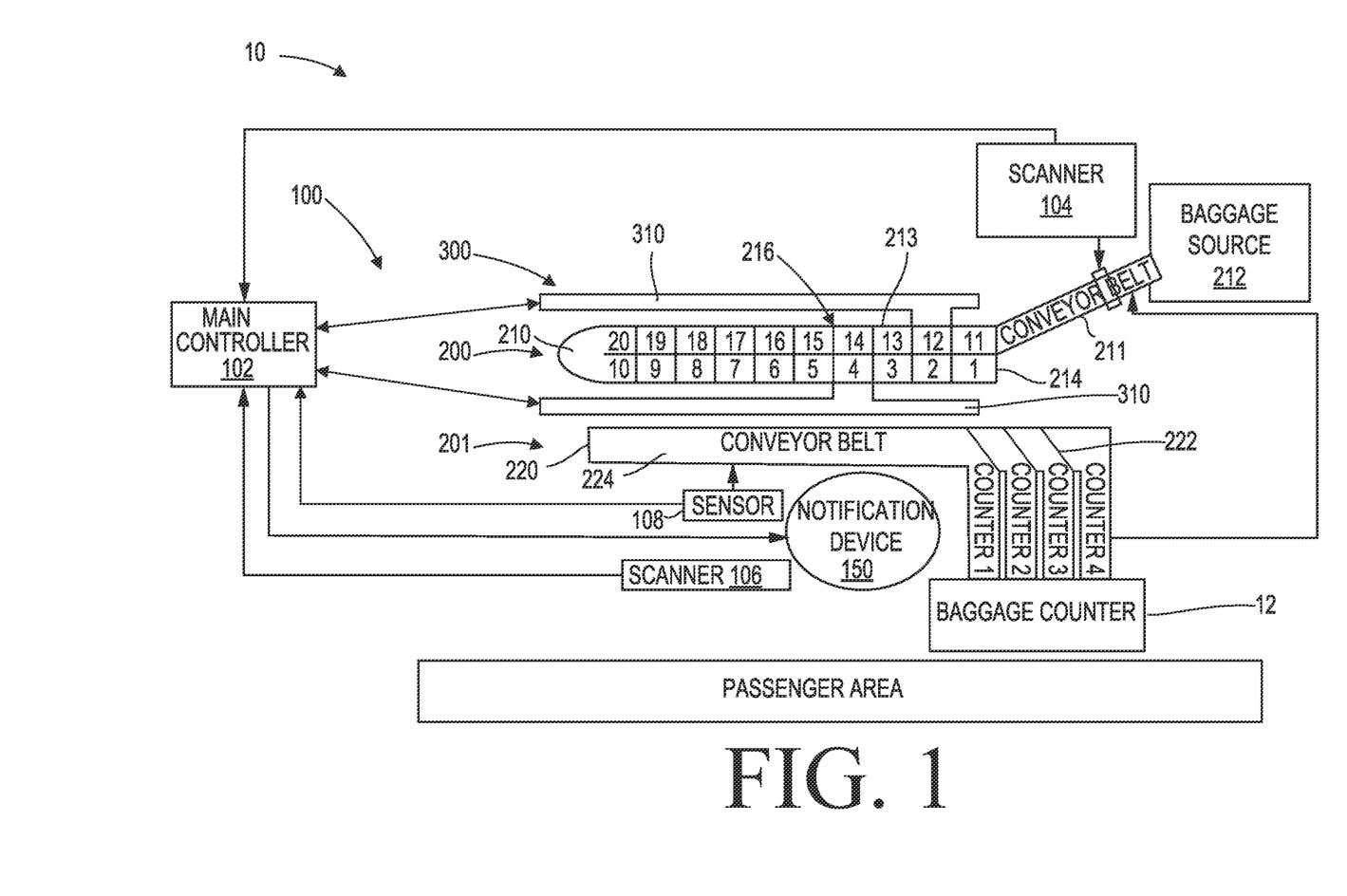
FIG. 1 illustrates a schematic view of a requestor based baggage collection system, in accordance with various embodiments.

Referring now to FIG. 1, a schematic view of a requestor based baggage collection system 10 is illustrated, in accordance with various embodiments. In various embodiments, the system 10 comprises a control system 100, a conveyor systems 200, 201, and a collection system 300. In various embodiments, as described further herein, the control system 100 is configured to control and command the collection system 300 (e.g., collection device(s) 310). In this regard, the control system 100 is configured to monitor, or track, a location of each bag of system 10 on conveyor belt 210 of conveyor system 200, receive a command to collect a respective bag from conveyor belt 210, determine a location of the respective bag on conveyor belt 210 of the conveyor system 200 based on the monitoring/tracking, command, through the collection system 300, transport of the bag from the location on conveyor belt 210 of conveyor system 200 to conveyor belt 220 of conveyor system 201, and send a command to a notification device to notify a user of a pickup location where conveyor belt 220 will deposit the bag, as described further herein.

Control system 100 may comprise a main controller 102. The main controller 102 may be integrated into computer system of an airport. In various embodiments, the main controller 102 may be configured as a central network element or hub to various systems and components of the control system 100. In various embodiments, main controller 102 may each comprise a processor. In various embodiments, main controller 102 may be implemented as a single controller (e.g., via a single processor and associated memory). In various embodiments, the main controller 102 may be implemented as multiple processors (e.g., a main processor and local processors for various components). The main controller 102 can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The main controller 102 may comprise a processor configured to implement various logical operations in response to execution of instructions, for example, instructions stored on a non-transitory, tangible, computer-readable medium configured to communicate with the main controller 102.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, conveyor system 200 comprises a conveyor belt 210. The conveyor belt 210 extends from a baggage source 212 to an end point 214 of a collection area 216. In various embodiments, the conveyor system 200 comprises a local controller separate from the main controller 102. In various embodiments, the conveyor system 200 is controlled by the control system 100. The present disclosure is not limited in this regard. In various embodiments, the baggage source 212 may comprise a baggage loading input (e.g., a chute), an adjacent conveyor system in an airport, or the like. The present disclosure is not limited in this regard. The conveyor belt 210 comprises an input conveyor belt 211 and a collection area belt 213. In various embodiments, a scanner 104 of the control system 100 is disposed proximate, the input conveyor belt 211. In this regard, the scanner 104 is configured to scan a unique identifier on each bag that input conveyor belt 211 transfers past the scanner 104. In various embodiments, the scanner is configured to identify a barcode, a QR code, a radio frequency identification (RFID) tag or any other method or system for identifying an item (hereinafter a "unique identifier").

Although described as being sized and configured based on a maximum number of bags on an aircraft, the present disclosure is not limited in this regard. For example, in various embodiments, conveyor belt 210 may be split up into segments of conveyor belts. In this regard, the conveyor belts may continuously move bags along the segments of conveyor belts towards the end point 214 after a respective bag is collected. In this regard, bags that are not in the collection area 216 may be transferred to the collection area 216 after collection of some of the bags in the collection area 216. Additionally, a respective location of each bag may be continuously monitored based on main controller 102 receiving data of which bags are being collected and transferred and having stored data corresponding to movements of the conveyor belt 210. In various embodiments, conveyor belt 210 may be in electronic communication with the main controller 102. In this regard, conveyor belt data may be transmitted to the main controller 102 for main controller 102 to monitor and track a baggage location for each bag, in accordance with various embodiments.

In various embodiments, collection area 216 may comprise any number of rows and any number of columns and still be within the scope of this disclosure. In various embodiments, the collection area is sized and configured based on a maximum total number of bags for a respective aircraft (e.g., a largest aircraft, or a specific sized aircraft that may be associated with a respective requestor based baggage collection system 10. In various embodiments, the collection system 300 comprises a collection device 310 for each respective row of a collection area 216. In this regard, the collection device 310 may be simplified and include reduced movements as opposed to a more complex collection device configured for collection of multiple rows. Although described herein with respect to a collection device 310 for each row, the present disclosure is not limited in this regard. For example, the collection device 310 may comprise a transportation unit configured to travel to various rows, collect a respective bag in a location of the collection area 216 and transfer the respective bag to the conveyor belt, in accordance with various embodiments (e.g., via radio signal communications or the like with the main controller 102, through respective transceivers, or transmitter and receivers).

In various embodiments, the collection device 310 comprises a mechanical shaft. The mechanical shaft may be configured to translate along a length of a respective row in the collection area 216, collect a respective bag from a location in the collection area 216 (e.g., locations 1-10 for row 1 and 11-20 for row 2 of collection area 216), and deposit the respective bag, and rotate to align the mechanical shaft with the conveyor belt 220 of conveyor system 201 and deposit the respective bag on the conveyor belt 220. In this regard, the collection device 310 is in electronic (e.g., wired or wireless) communication with the main controller 102.

In various embodiments, the conveyor system 201 comprises a conveyor belt 220 and a valve 222 for a total number of counters minus one. In this regard, when a first valve in the valves 222 proximal a load area 224 of the conveyor belt 220, a respective bag may be deposited in counter 1. Thus, main controller 102 may determine a location for each bag that is requested to be deposited for pickup at a respective pickup location (e.g., a baggage counter 12) of the requestor based baggage collection system 10. Although illustrated with valves 222, the present disclosure is not limited in this regard, the baggage may be sent to a verification counter, which could be manned by an individual indicating which bag has arrived, in accordance with various embodiments.

In various embodiments, a sensor 108 may be coupled to conveyor belt 220. The sensor 108 may comprise a speed sensor or the like. In this regard, the sensor 108 may provide information as to a speed of the conveyor belt 220 is moving and be able to determine an estimated time, based on the speed information, that a respective bag will take to be deposited at a respective counter (e.g., counters 1-4). Although illustrated as having four counters, the present disclosure is not limited in this regard, and any number of counters and respective valves 222 are within the scope of this disclosure.

In various embodiments, the control system 100 further comprises a scanner 106. The scanner 106 is configured to a scan a unique identifier of a passenger (e.g., a tag received by a passenger with a barcode, a QR code, a radio frequency identification (RFID) tag, or the like, as described previously herein).

In various embodiments, the control system 100 further comprises a notification device 150. The notification device 150 may comprise a speaker, a display device (e.g., a monitor), or the like. In this regard, after scanning a unique identifier via the scanner 106, the passenger may be notified which counter the passenger's bag will be deposited at (e.g., counter 1, 2, 3, or 4), in accordance with various embodiments.

Figure 2:
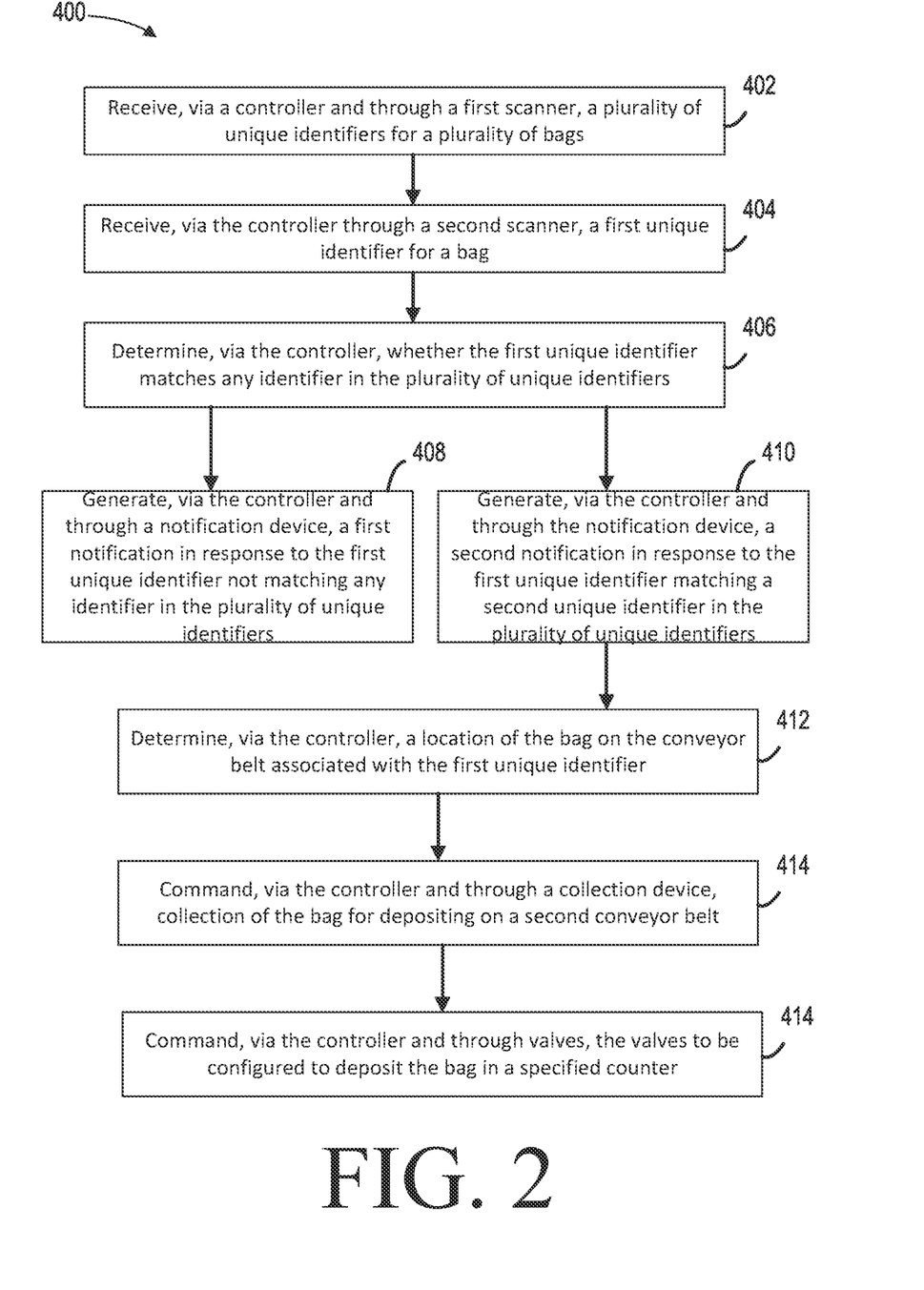
FIG. 2 illustrates a process for a control system for operating a requestor based baggage collection system.

Referring now to FIGS. 1 and 2, a process 400 for operating the control system 100 from FIG. 1 is illustrated, in accordance with various embodiments. The process 400 comprises receiving, via a main controller 102 and through a scanner 104, a plurality of unique identifiers for a plurality of bags (step 402). The scanner 104 is disposed proximate, the input conveyor belt 211. In this regard, the scanner 104 is configured to scan each bag in the plurality of bags as they travel past the scanner 104 on the input conveyor belt 211 of the conveyor system 200. In this regard, all bags of a respective flight, or some bags of a respective flight may be scanned.

The process 400 further comprises receiving, via the controller and through a second scanner 106, a first unique identifier for a bag (step 404). The process 400 further comprises determining, via the main controller 102, whether the first unique identifier matches any identifier in the plurality of unique identifiers (step 406). In various embodiments, the bag associated with the first unique identifier may not have been scanned yet or collection area 216 may be filled with bags if the collection area 216 is sized less than a maximum number of bags.

The process 400 further comprises generating, via the main controller 102 and through a notification device 150, a first notification in response to the first unique identifier not matching any identifier in the plurality of unique identifiers (step 408). In various embodiments, the first notification may indicate to the user the bag has not been loaded into the conveyor system 200 yet, an amount of time to wait prior to re-scanning, or the like. The present disclosure is not limited in this regard.

The process 400 further comprises generating, via the main controller 102 and through the notification device 150, a second notification in response to the first unique identifier matching a second unique identifier in the plurality of unique identifiers (step 410). In this regard, the bag associated with the first unique identifier is determined to be within the collection area 216 of conveyor system 200. Additionally, the second notification may comprise an indicator of a specified baggage counter the bag will be deposited out of (e.g., counter 1, 2, 3, or 4).

The process 400 further comprises determining, via the controller, a location of the bag associated with the first unique identifier on the conveyor belt 210 in the collection area 216 (step 412). In various embodiments, determining the location of the bag may be based on scanning data from step 402. In this regard, an order of bags may be determined by main controller 102. Thus, an end location of each bag in the collection area 216 may be determined by the main controller 102. After collection of various bags, the main controller 102 may update locations of various bags based on known operations of conveyor belt 210. For example, conveyor belt 210 may be configured to translate bags to an updated location once a bag is collected in an adjacent location, conveyor belt 210 may remain fixed until all bags in the collection area 216 are collected, or the like, the present disclosure is not limited in this regard.

The process 400 further comprises commanding, via the main controller 102 and through a collection device 310, collection of the bag for depositing on a second conveyor belt 220 of conveyor system 201 (step 414). In this regard, the collection device 310 may collect the bag and deposit the bag on the second conveyor belt 220.

The process 400 further comprises commanding, via the main controller 102 and through valves 222), the valves to be oriented in a manner to deposit the bag in the specified baggage counter of step 410. In this regard, the bag will be deposited at the baggage counter for which the user was notified in step 410. Thus, the process and systems disclosed herein are configured to ensure a correct bag is collected by an owner of the respective bag, reduce theft or misidentified bags, and/or provide greater passenger convenience relative to typical bags.

Figure 3:
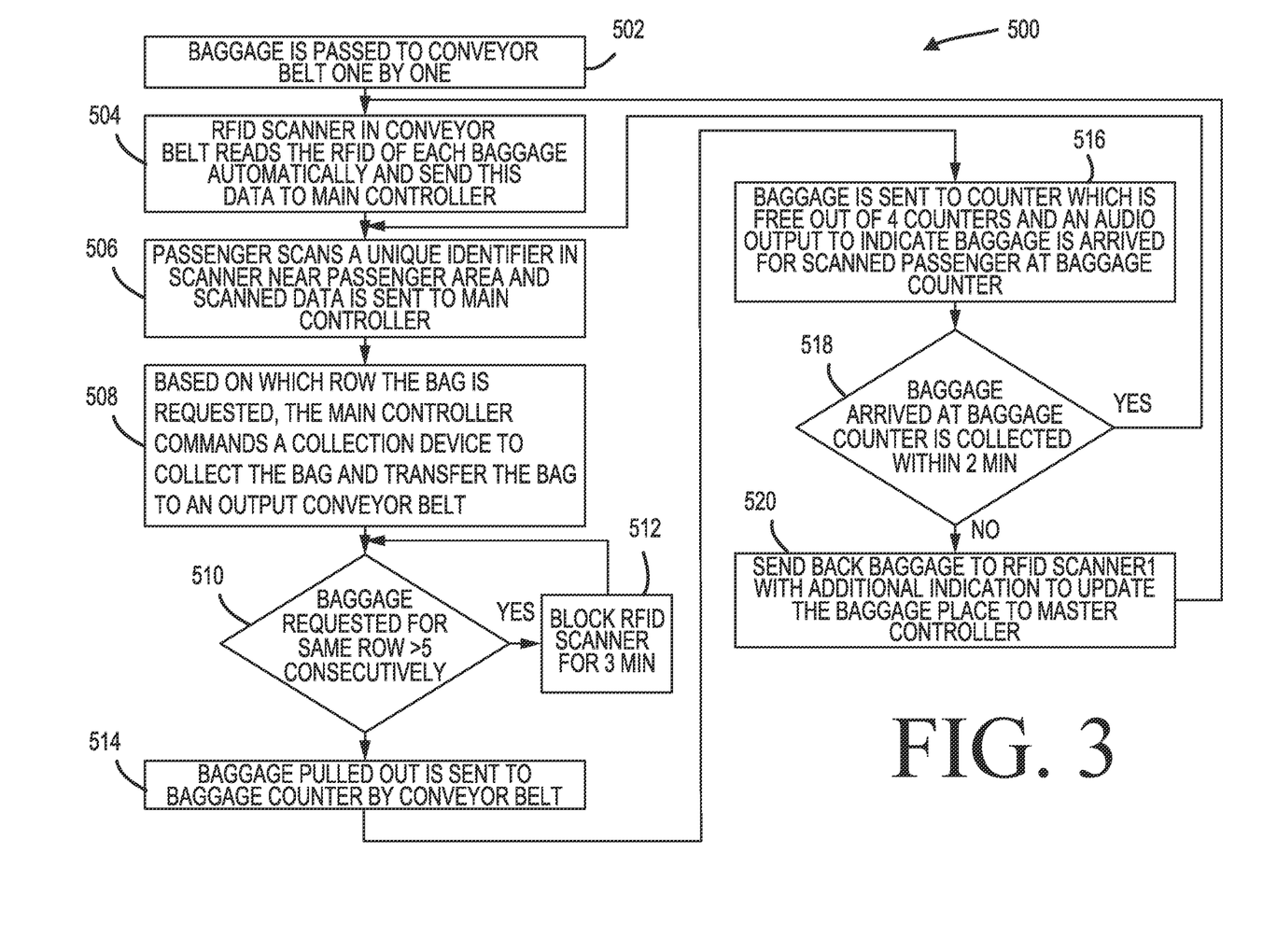
FIG. 3 illustrates a process for operating a requestor based baggage collection system.

Referring now to FIGS. 1 and 3, a flow chart for the requestor based baggage system 10 from FIG. 1 is illustrated, in accordance with various embodiments. The process 500 comprises passing baggage via a baggage source 212 onto an input conveyor belt 211 of a conveyor system 200 (step 502). The baggage travels along input conveyor belt 211 one by one and is scanned by the scanner 104. In this regard, a unique identifier of each bag traveling past the scanner 104 is sent to the main controller 102 and stored therein (step 504).

A unique identifier is received via the scanner 106 disposed proximate a passenger area, and the unique identifier is sent to the main controller 102 for processing (step 506). Based on which row the bag that is requested is in, the main controller 102 commands a collection device associated with that row, in accordance with various embodiments, to collect the bag and transfer the bag to the conveyor belt 220 of the conveyor system 201 (step 508). If baggage is requested for a same row consecutively greater than a predetermined number of times (e.g., five times) (step 510, a notification may be sent to the notification device 150 (e.g., via the main controller 102) indicating the scanner will be blocked for a predetermined number of minutes due to a backlog of requests (step 512).

Baggage proceeds to be pulled out via the collection device 310 and placed on the conveyor belt 220 of the conveyor system 201 (step 514). The baggage is then sent to a pickup location (e.g., counter 1, 2, 3, or 4) that is free by orienting valves 222 in a manner to deliver the baggage to the respective pickup location (step 516). Based on prior requests, the main controller 102 may determine which counter the baggage will be delivered to prior to collecting the baggage.

The process 500 further comprises determining whether the baggage has been collected from the respective counter within a predetermined period of time (e.g., two minutes) (step 518). If the baggage is collected, data that the baggage was collected may be sent to main controller 102 via any method (e.g., a weight sensor or the like) to indicate the respective counter is free. If the baggage is not collected within the predetermined amount of time, the baggage may be sent back to the input conveyor belt 211 of the conveyor system 200 to be re-processed through the system (step 520).

In various embodiments, the systems and method disclosed herein may provide extra convenience for passengers relative to typical systems. In various embodiments, a rush at respective counters may be avoided as a notification as to which counter has a passengers bag will be predetermined and indicated to a respective passenger. In various embodiments, the requestor based baggage system 10 may prevent a mix up of bags or the like as each bag is verified prior to being sent to a baggage counter. In various embodiments, theft of baggage may be avoided.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An article of manufacture including a tangible, non-transitory computer-readable storage medium having instructions stored thereon that, in response to execution by a processor, cause the processor to perform operations comprising:
   receiving, by the processor and through a first scanner, a plurality of unique identifiers for a plurality of bags;
   receiving, by the processor through a second scanner, a first unique identifier for a bag;
   determining, by the processor, a location of the bag in a collection area of a conveyor system associated with the first unique identifier, wherein the collection area is a first conveyor belt, wherein the first conveyor belt is split into a plurality of unique segments, and wherein each segment of the plurality of unique segments has a unique location for an associated bag on the first conveyor belt; and
   commanding, by the processor and through a collection device, transferring of the bag from the location on the first conveyor belt to a second conveyor belt for depositing the bag at a pickup location.

2. The article of manufacture of claim 1, wherein the operations further comprise determining, by the processor, whether the first unique identifier is a match with any identifier in the plurality of unique identifiers.

3. The article of manufacture of claim 2, wherein the operations further comprise generating, by the processor and through a notification device, a first notification in response to the first unique identifier not matching any identifier in the plurality of unique identifiers.

4. The article of manufacture of claim 3, wherein the operations further comprise generating, by the processor and through the notification device, a second notification in response to the first unique identifier matching a second unique identifier in the plurality of unique identifiers.

5. The article of manufacture of claim 4, wherein the operations further comprise identifying a specified location for depositing the bag at the pickup location.

6. The article of manufacture of claim 5, wherein the operations further comprise commanding, by the processor and through various valves, the various valves to be oriented in a manner to deposit the bag at the specified location.

7. The article of manufacture of claim 1, wherein the operations further comprise determining, by the processor, the bag has been at the pickup location for more than a time threshold.

8. The article of manufacture of claim 7, wherein the operations further comprise commanding, by the processor, the bag to be transported to an input conveyor belt at a point prior to the first scanner to be resent through the conveyor system.

9. A method for operating a requestor-based baggage collection system, the method comprising:
   receiving, by a processor, a plurality of unique identifiers for a plurality of bags;
   receiving, by the processor, a first unique identifier for a bag;
   determining, by the processor, a location of the bag in a collection area of a conveyor system associated with the first unique identifier, wherein the collection area is a first conveyor belt, wherein the first conveyor belt is split into a plurality of unique segments, and wherein each segment of the plurality of unique segments has a unique location for an associated bag on the first conveyor belt; and
   commanding, by the processor, transferring of the bag from the location on the first conveyor belt to a second conveyor belt for depositing the bag at a pickup location.

10. The method of claim 9, further comprising determining, by the processor, whether the first unique identifier is a match with any identifier in the plurality of unique identifiers.

11. The method of claim 10, further comprising generating, by the processor and through a notification device, a first notification in response to the first unique identifier not matching any identifier in the plurality of unique identifiers.

12. The method of claim 11, further comprising generating, by the processor and through the notification device, a second notification in response to the first unique identifier matching a second unique identifier in the plurality of unique identifiers.

13. The method of claim 12, further comprising identifying a specified location for depositing the bag at the pickup location.

14. The method of claim 13, further comprising commanding, by the processor and through various valves, the various valves to be oriented in a manner to deposit the bag at the specified location.

15. The method of claim 9, further comprising determining, by the processor, the bag has been at the pickup location for more than a time threshold.

16. The method of claim 15, further comprising commanding, by the processor, the bag to be resent, via an input conveyor belt, through the conveyor system.

17. A requestor based baggage collection system, comprising:
   a first conveyor system comprising an input conveyor belt and a collection area, wherein the collection area is a first conveyor belt, wherein the first conveyor belt is split into a plurality of unique segments, and wherein each segment of the plurality of unique segments has a unique location for an associated bag on the first conveyor belt;
   a first scanner configured to scan a first unique identifier of a bag travelling along the input conveyor belt;
   a second scanner configured to scan a second unique identifier associated with the bag;
   a second conveyor system comprising a second conveyor belt configured to transfer the bag to an end baggage location; and
   a collection device configured to transfer the bag from the collection area location on the first conveyor belt to the second conveyor belt.

18. The requestor based baggage collection system of claim 17, further comprising a main controller in electronic communication with the first scanner, the second scanner, and the collection device.

19. The requestor based baggage collection system of claim 18, wherein the main controller is configured to:
- receive, from the second scanner, the second unique identifier associated with the bag;
- determine, from data received from the first scanner, a location of the bag on the first conveyor belt; and
- command the collection device to transfer the bag from the location on the first conveyor belt to the second conveyor belt.

20. The requestor based baggage collection system of claim 19, wherein the main controller is further configured to determine the second unique identifier is a match with the first unique identifier.

* * * * *

UNITED STATES PATENT AND TRADEMARK OFFICE
CERTIFICATE OF CORRECTION

PATENT NO. : 12,459,751 B2  
APPLICATION NO. : 17/709090  
DATED : November 4, 2025  
INVENTOR(S) : Yadhu Kumar Hosahalli Lingaiah Page 1 of 1

It is certified that error appears in the above-identified patent and that said Letters Patent is hereby corrected as shown below:

In the Claims

Column 10, Claim 17 Line 66 delete "collection area"

Signed and Sealed this  
Twentieth Day of January, 2026

John A. Squires  
*Director of the United States Patent and Trademark Office*